United States Patent Office.

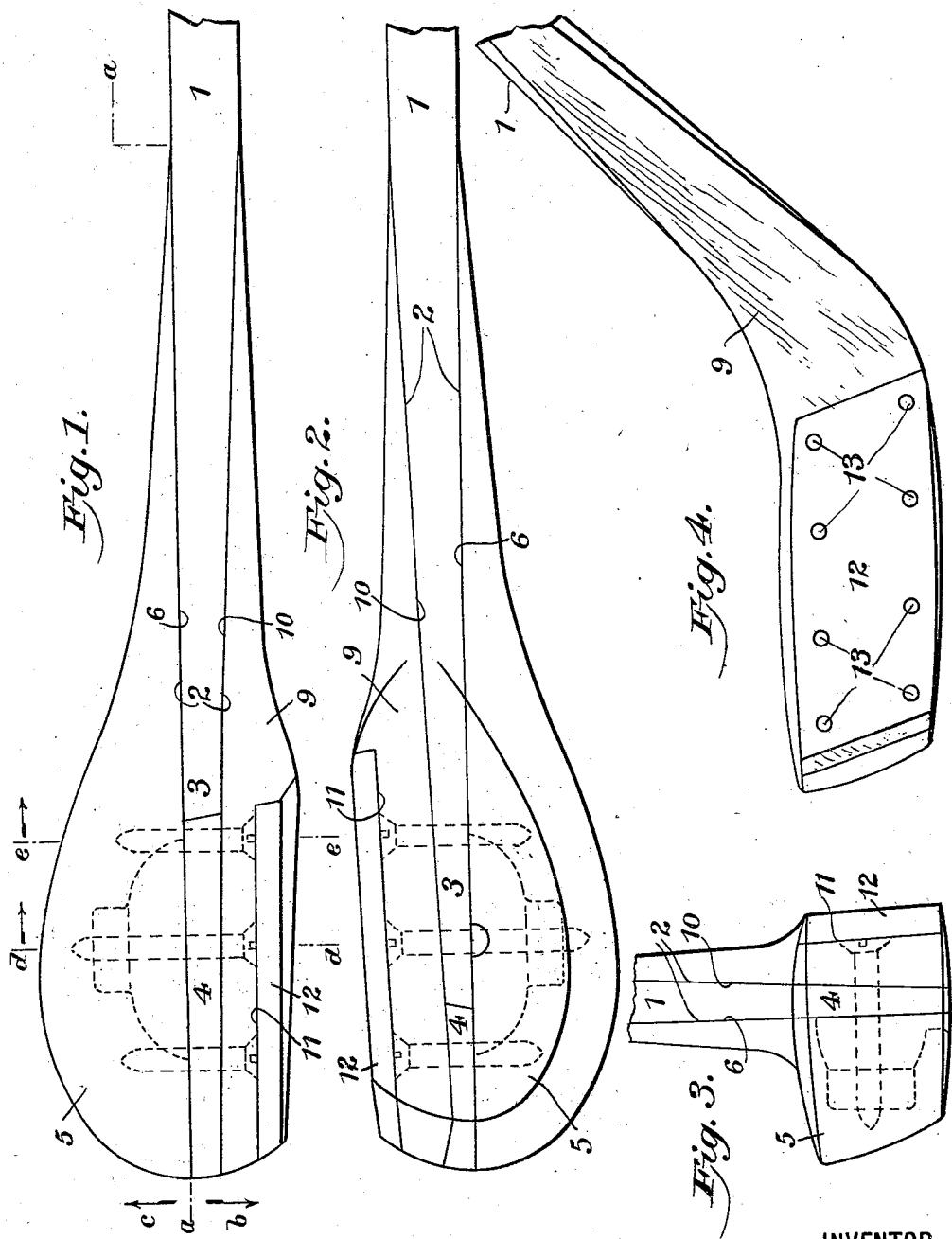

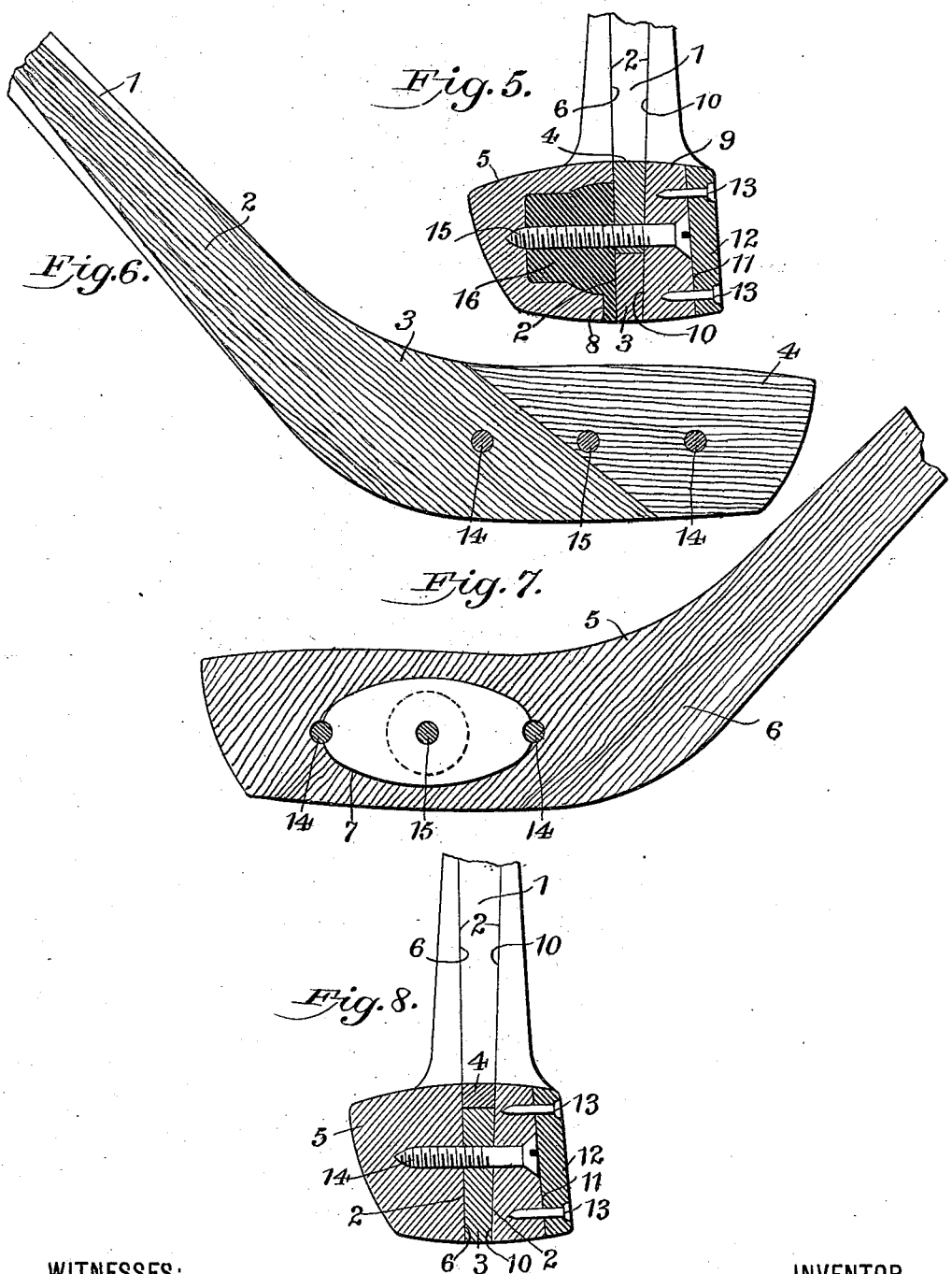

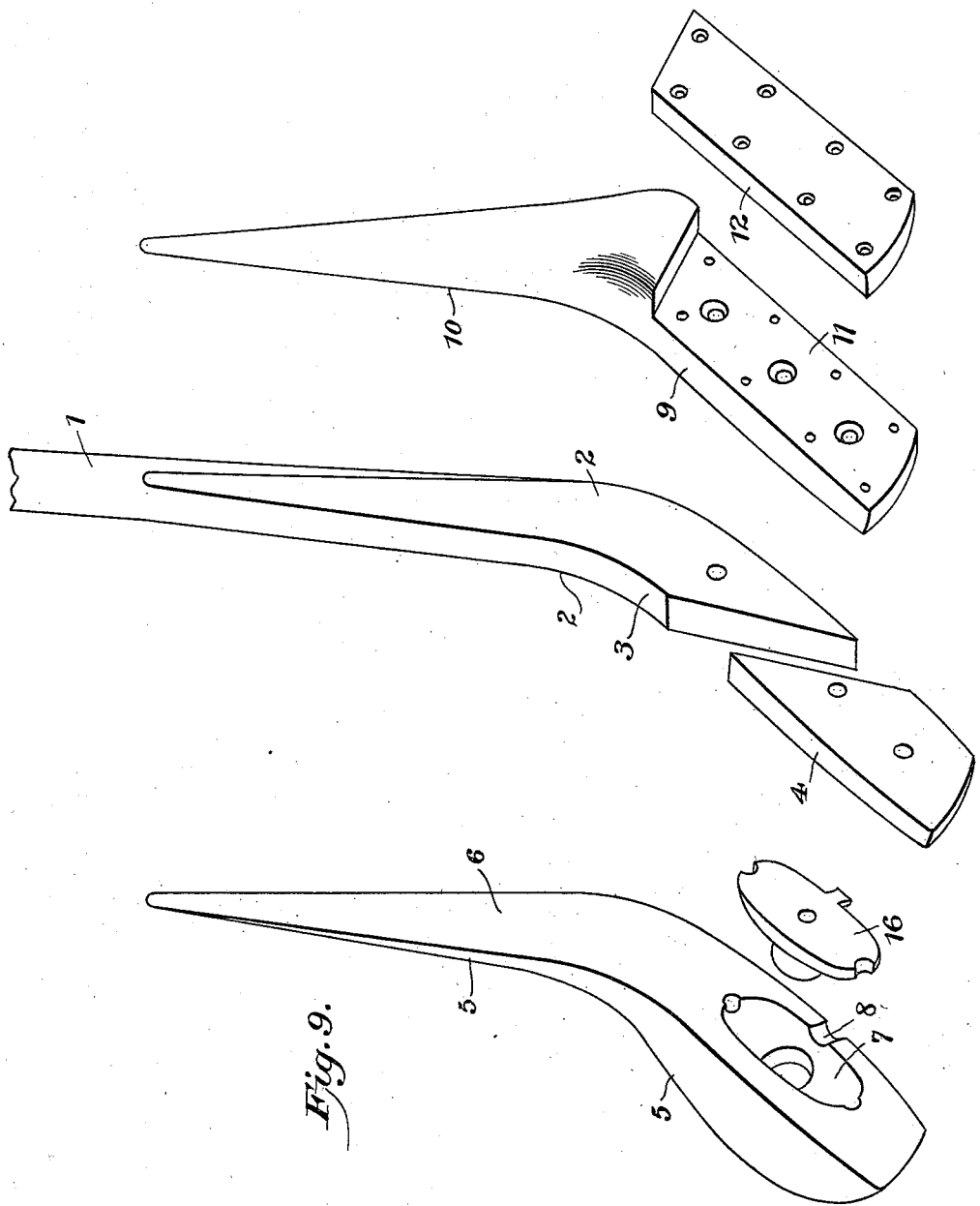

WARREN R. BRIGGS, OF BRIDGEPORT, CONNECTICUT.

GOLF-DRIVER.

SPECIFICATION forming part of Letters Patent No. 556,042, dated March 10, 1896.

Application filed December 26, 1895. Serial No. 573,298. (No model.)

*To all whom it may concern:*

Be it known that I, WARREN R. BRIGGS, a citizen of the United States, residing at Bridgeport, in the county of Fairfield and State of Connecticut, have invented certain new and useful Improvements in Golf-Drivers; and I do hereby declare the following to be a full, clear, and exact description of the invention, such as will enable others skilled in the art to which it appertains to make and use the same.

My invention relates to certain new and useful improvements in golf-drivers, and has for its objects, first, to do away with the necessity of making the driving-heads from integral natural bends or crooks; second, to greatly strengthen the head to a degree which could not be attained by making such head from an integral piece of wood; third, to balance the head so that it hangs properly to the handle, without the use of extra weights; fourth, to so weight the head that the latter will not have a tendency to turn the handle in the hands of the user; fifth, to dispose of the weight in such a manner that the broad bulk of the same is nearest to the driving-face of the head; sixth, to splice the handle and the head-sections together in such manner that the wrenching or wear against the winding-cord which secures such splice is reduced to a minimum, and, finally, to greatly cheapen the manufacture of first-class golf-clubs.

Referring to the accompanying drawings, which form a part of this specification, Figures 1 and 2 are top and bottom views, respectively, of my improved golf-driver; Fig. 3, an end elevation; Fig. 4, a side elevation; Fig. 5, a section on the line $d\,d$ of Fig. 1; Fig. 6, a section on the line $a\,a$ of Fig. 1, looking in the direction of the arrow $b$; Fig. 7, a section on the line $a\,a$ of Fig. 1, looking in the direction of the arrow $c$; Fig. 8, a section on the line $e\,e$ of Fig. 1, and Fig. 9 a perspective view of the parts of my improvement in detached position.

Similar numbers of reference denote like parts in the several figures of the drawings.

1 is the handle which at the bottom is laterally flattened on each side, as shown at 2. The upper portion of said handle 1 is shown broken away in the drawings, since the construction of such portion is very ordinary and does not enter into my invention. The lower end of the handle is curved to form a short offset 3, and the extreme edge of said offset is beveled, as shown in Figs. 6 and 9.

It will be observed by reference to Fig. 6 that the grain of the wood of which the handle 1 and offset 3 formed thereon is made runs in a line lengthwise of said handle, and parallel with the striking-face of the club, the obvious reason of which is to render said handle strong and elastic.

The head of the driver is composed of several sections made of wood, and said sections are cut and put together in such a way that the grain of the wood of each section runs in a direction parallel with the striking-face of the club, and that there is no part of the head in which the grain runs crosswise or toward the striking-face, so that it will be clear that a blow against the face of the club will be in a direction at right angles to the grain, thus getting the full benefit of both the strength and elasticity of the wood which composes such head. The center section, 4, of the driver is beveled to correspond to the beveled edge of the offset 3, so that said beveled parts when assembled make a close joint.

It will be observed by reference to Fig. 6 that the grain of the section 4 runs lengthwise thereof and at an angle of about forty-five degrees to the line of the grain of the handle, but while these grains reinforce each other it will also be observed that they extend in planes which are parallel with the striking-face of the club.

5 is the back or weight section, which has a flattened face 6 corresponding to one of the flat sides on the handle 1, and 7 is a weight-chamber cut within said section from the inside. A gate 8 leads from the bottom of said section 5 into said chamber 7.

9 is the driving-face, which is flat, as shown at 10, so as to lie snugly against the flattened surface 2 on the handle, and has a seat 11 cut in the outside, within which is secured a suitable leather or other facing 12 by nails 13.

In assembling the parts the center section, 4, is preferably joined to the offset 3 on the handle by gluing, and the weight or back section and driving-face are then also glued to the flat surfaces formed by said section 4 and offset 3. The parts are then firmly secured together by screws 14 15, as shown in Figs. 5 and 8. Said screws 14 pass entirely through the driving-face and offset and center section, 4, into the weight-section 5, the heads of said screws being flush with the surface of the seat 11 on the driving-face. The center screw, 15, is somewhat longer than the other screws and passes through the driving-face and section 4 into the back section and through the center of the chamber 7.

The weight 16 is made of lead, which is run within the chamber 7 through the gate 8. Thus it will be seen that said weight will be firmly anchored around the screw 15 within said chamber and cannot possibly become loose or disarranged.

After the facing 12 has been secured in proper position on the driving-face the heads of the screws will be out of sight, thus giving a neater and more attractive appearance to the driver. The driving-face and back section at their upper portions are so shaped that when they lie against the flat sides of the handle the three parts thus assembled will present a unitary appearance or, in other words, a perfect splice, which latter after the spliced parts have been properly united by gluing is wound with cord in the usual manner.

Of course it is not essential that the gate 8 should lead into the chamber 7 from the bottom of the driver, since said gate might with equally good results enter said chamber from the top or side of the driver, and I do not wish to be limited in this respect, and, furthermore, the weight itself may be anchored to the weight-section of the driver in any desirable manner without departing from the spirit of my invention; but in arranging said weight in the position and manner I have shown numerous advantages result therefrom. For instance, by locating said weight at or near the center of the driver the tendency of said driver to turn in the hands when being swung is avoided, and the player is thereby enabled to exercise greater accuracy. Again, the broad flat face of the lead is in a plane directly opposed to the ball during striking, so that the center of the ball and center of the weight come in line and greater benefit from the weight may be obtained.

Heretofore, the heads of implements of this description have been cut from a single piece of wood having a natural bend, the handle being spliced to said head at or near such bent portion; but, owing to the fact that pieces of wood having the proper natural bend required are more or less difficult to procure, the drivers thus constructed were rendered somewhat expensive, and notwithstanding the great care exercised in their manufacture often proved to be greatly defective and weak at the point where they are spliced to the handles, as is evidenced by their frequent breaking or detachment when in use. Expert golf-players are oftentimes put to great annoyance by this breaking of the drivers when in the midst of a game, for the reason that when a player has become thoroughly accustomed to the weight, length, shape, and elasticity of the handle of the driver, and such driver becomes broken it is by no means an easy matter for him to readily adapt himself to a new driver.

Aside from the expense occasioned by the breaking of drivers, it will be seen that the importance of having a driver which is so constructed that the breaking of the same when in use is a remote possibility is of great value to the expert.

It will be observed that the joints of the splices between the lower portion of the handle and the sections which compose the head of the club extend in a vertical plane, or, in other words, in a plane substantially at right angles to the plane in which the head is swung when the club is used. This arrangement is directly opposite to that which characterizes these clubs as heretofore made, and in the latter, no matter how firmly the spliced portions are glued together, the force with which the head is swung will wrench these portions apart, whereupon the winding cord will loosen and the head will then become disengaged from the handle. In my improvement this disadvantage and annoyance is obviated, and I am enabled to make a most superior club in this respect, since the head is formed from sections firmly secured together, with the grain of each section running in planes that are parallel with the striking-face of the club, so disposed as to reinforce the grain of the adjacent section.

The section 4 may be integral with the offset 2 at the lower portion of the handle, but I prefer to make this section separate, since I am thereby enabled to use a piece of wood the grain of which is opposed to the grain of the offset.

By constructing the driver of several sections, not only is the manufacture of the same cheapened, but said driver is rendered far stronger and more serviceable in every way, for in making the driver in this manner different kinds of woods may be employed in the construction of the several sections, and the latter are so arranged that the grain of each section always runs parallel with the striking-face of the club, and in no instance is at an angle thereto.

It is evident that the driver may be constructed with a greater number of sections than I have herein shown, such sections being made thinner and put together after the manner of veneering, but in such instance, while said sections would be so arranged that the grain of each section would reinforce the grain of an adjacent section, it is absolutely necessary that all the different grains should run in planes that are parallel with the striking-face of the club. I therefore do not wish to be limited in this respect, for such modification would be clearly within the scope of my invention.

Having thus fully described my invention, what I claim as new, and desire to secure by Letters Patent, is—

1. In a golf-driver, the head made from sections one of which is integral with the handle, while the other sections are spliced to the sides of said handle in a plane which is substantially parallel with the driving-face and at right angles to the bottom of the head, these head-sections being firmly united together by glue and screws, while the grains of said sections are in planes which are parallel with the striking-face of the club, substantially as set forth.

2. In a golf-driver, the combination of the handle, the driving-head composed of several sections of wood secured together, the grain of the handle and each section running in directions that are parallel with the striking-face of the club, and means for splicing and securing said head to said handle, substantially as set forth.

3. In a golf-driver, the combination of the handle having the flattened sides at its lower extremity, the driving-head composed of the center section, the driving-face and weight-section, said parts being cut from wood in such manner that when arranged in proper relative position with respect to each other the grain of the wood of each part will be parallel with the striking-face of the club and will run in a direction at an angle to the direction of the grain of its adjacent part and means for securing all of said parts firmly together and splicing the head thus formed to the flattened sides of said handle, substantially as described.

4. The combination of the handle having the flattened sides formed on its lower extremity and terminating in a vertically-disposed offset, the center section of the driving-head joined directly to the end of said offset, the driving-face and weight-section having flattened faces which correspond to the flattened sides of said handle, and means for securing all these parts firmly together and splicing the head thus formed to the flattened sides of said handle, substantially as described.

5. The combination of the handle having the flattened vertical sides formed on its lower extremity and terminating in a vertically-disposed offset, the center section of the driving-head joined directly to the end of said offset, the driving-face and weight-section having flattened faces which correspond with the flattened sides of said handle, said parts being first glued together and then further secured by screws 14, 15, as described, the driving-face having a seat cut therein within which is secured a facing whereby the heads of said screws 14, 15, are concealed, substantially as set forth.

6. The combination of the handle having the flattened vertical sides formed on its lower extremity, the driving-head composed of several sections and spliced to the flattened sides of said handle as described, the weight-section being provided with a chamber 7 having a gate 8 through which molten lead is run to form the weight contained in said chamber, substantially as set forth.

7. The combination of the handle having the flattened vertical sides formed on its lower extremity, the driving-head spliced to said handle and composed of several sections glued together and further secured by screws 14,15, the weight-section being provided with a chamber 7 through which the screw 15 passes and a gate 8 which communicates with said chamber from the outside through which molten lead is run to form the weight, whereby said weight is firmly anchored around said screw 15 within said chamber, substantially as described.

In testimony whereof I affix my signature in presence of two witnesses.

WARREN R. BRIGGS.

Witnesses:
F. W. SMITH, Jr.,
M. T. LONGDEN.